United States Patent
Kalley et al.

(10) Patent No.: US 11,907,743 B2
(45) Date of Patent: Feb. 20, 2024

(54) SYSTEM AND METHOD FOR RELOCATING CUSTOMER VIRTUAL MACHINE INSTANCES IN A MULTI-TENANT CLOUD SERVICE

(71) Applicant: ORACLE INTERNATIONAL CORPORATION, Redwood Shores, CA (US)

(72) Inventors: Harshit K. Kalley, Sunnyvale, CA (US); Akshay Shah, San Jose, CA (US); Bruno Alvisio, Santa Clara, CA (US); Yafeng Wang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 16/877,875

(22) Filed: May 19, 2020

(65) Prior Publication Data
US 2020/0371830 A1    Nov. 26, 2020

Related U.S. Application Data

(60) Provisional application No. 62/850,794, filed on May 21, 2019.

(51) Int. Cl.
*G06F 9/455* (2018.01)
*G06F 9/54* (2006.01)
(Continued)

(52) U.S. Cl.
CPC ............ *G06F 9/45558* (2013.01); *G06F 8/65* (2013.01); *G06F 9/546* (2013.01);
(Continued)

(58) Field of Classification Search
None
See application file for complete search history.

(56) References Cited

U.S. PATENT DOCUMENTS 7,383,405 B2   6/2008  Vega et al.
8,046,767 B2  10/2011  Rolia et al.
(Continued)

FOREIGN PATENT DOCUMENTS

CN    102629207 A   8/2012
CN    102655503 B   9/2015

OTHER PUBLICATIONS

Rolia et al., A Capacity Management Service for Resource Pools, ACM Digital Library, pp. 1-2, downloaded on Jan. 25, 2018 from: https://dl.acm.org/citation.cfm?id=1071047.
(Continued)

*Primary Examiner* — Lewis A Bullock, Jr.
*Assistant Examiner* — Melissa A Headly
(74) *Attorney, Agent, or Firm* — Kraguljac Law Group, LLC (57) ABSTRACT

Systems, methods, and other embodiments associated with performing maintenance of a hardware node and relocating (live migrating) virtual machine (VM) instances in a multi-tenant, hyper scale, public Cloud service are described. In one embodiment, the method includes finding a suitable hardware node for hosting one or more VM instances from a hardware node selected for maintenance, preparing it for hosting VMs, and moving (live migrating) all virtual machines from the hardware node to the hosting hardware node.

15 Claims, 4 Drawing Sheets

(51) Int. Cl.
*G06Q 10/20* (2023.01)
*G06Q 10/0631* (2023.01)
*H04L 41/026* (2022.01)
*G06F 8/65* (2018.01)
*G06Q 30/016* (2023.01)

(52) U.S. Cl.
CPC . *G06Q 10/06312* (2013.01); *G06Q 10/06315* (2013.01); *G06Q 10/20* (2013.01); *H04L 41/026* (2013.01); *G06F 2009/4557* (2013.01); *G06F 2009/45591* (2013.01); *G06F 2009/45595* (2013.01); *G06Q 30/016* (2013.01)

(56) References Cited

U.S. PATENT DOCUMENTS

| | | | |
|---|---|---|---|
| 8,316,130 B2 | 11/2012 | Breiter et al. | |
| 8,463,908 B2 | 6/2013 | Murray et al. | |
| 8,595,722 B2 | 11/2013 | Gupta et al. | |
| 8,639,793 B2 | 1/2014 | Kapur et al. | |
| 8,938,540 B2 | 1/2015 | Van Biljon et al. | |
| 8,977,679 B2 | 3/2015 | Van Biljon et al. | |
| 9,069,590 B2 | 6/2015 | Gupta | |
| 9,141,487 B2 | 9/2015 | Jagtiani et al. | |
| 9,152,405 B2 | 10/2015 | Gupta et al. | |
| 9,189,259 B2 | 11/2015 | Anderson et al. | |
| 9,218,616 B2 | 12/2015 | Van Biljon et al. | |
| 9,250,944 B2 | 2/2016 | Anderson et al. | |
| 9,251,349 B2 | 2/2016 | Haikney et al. | |
| 9,253,114 B2 | 2/2016 | Anderson et al. | |
| 9,285,196 B2 | 2/2016 | Dettori et al. | |
| 9,361,092 B1 | 6/2016 | Bai et al. | |
| 9,384,029 B1* | 7/2016 | Brandwine | G06F 9/5077 |
| 9,396,220 B2 | 7/2016 | Li et al. | |
| 9,405,530 B2 | 8/2016 | Islam et al. | |
| 9,471,350 B2 | 10/2016 | Pavlas et al. | |
| 9,569,259 B2 | 2/2017 | Fries et al. | |
| 9,582,319 B2 | 2/2017 | Ayala et al. | |
| 9,606,826 B2 | 3/2017 | Ghosh et al. | |
| 9,705,820 B2 | 7/2017 | Madduri et al. | |
| 9,712,503 B1 | 7/2017 | Ahmed et al. | |
| 9,736,252 B2 | 8/2017 | Ferris et al. | |
| 9,755,990 B2 | 9/2017 | Vicaire | |
| 9,767,494 B2 | 9/2017 | Van Biljon et al. | |
| 9,779,126 B2 | 10/2017 | Tu et al. | |
| 10,326,708 B2 | 6/2019 | Palan et al. | |
| 2008/0022284 A1 | 1/2008 | Cherkasova et al. | |
| 2010/0281285 A1 | 11/2010 | Blanding | |
| 2013/0159453 A1 | 6/2013 | McLean | |
| 2014/0068343 A1* | 3/2014 | Nakajima | G06F 11/0793 714/39 |
| 2015/0212853 A1* | 7/2015 | Makino | G06F 9/5038 718/103 |
| 2015/0286507 A1 | 10/2015 | Elmroth et al. | |
| 2015/0372938 A1 | 12/2015 | Patel et al. | |
| 2015/0372941 A1 | 12/2015 | Patel et al. | |
| 2016/0013992 A1* | 1/2016 | Reddy | H04L 47/822 709/224 |
| 2016/0253198 A1* | 9/2016 | Gallant | G06F 9/45558 718/1 |
| 2016/0378524 A1 | 12/2016 | Gough et al. | |
| 2017/0116207 A1 | 4/2017 | Lee et al. | |
| 2017/0116213 A1 | 4/2017 | Jain et al. | |
| 2017/0116249 A1 | 4/2017 | Ravipati et al. | |
| 2017/0116298 A1 | 4/2017 | Ravipati et al. | |
| 2017/0116334 A1 | 4/2017 | Kruglikov et al. | |
| 2017/0187806 A1 | 6/2017 | Wang et al. | |
| 2017/0364387 A1* | 12/2017 | Ahmed | G06F 3/0664 |
| 2018/0075041 A1 | 3/2018 | Susairaj et al. | |
| 2018/0075044 A1 | 3/2018 | Kruglikov et al. | |
| 2020/0007418 A1 | 1/2020 | Greenstein et al. | |
| 2020/0007456 A1 | 1/2020 | Greenstein et al. | |
| 2020/0007457 A1 | 1/2020 | Greenstein et al. | |
| 2020/0007631 A1 | 1/2020 | Greenstein et al. | |
| 2020/0159556 A1* | 5/2020 | Chandrappa | G06F 9/54 |

OTHER PUBLICATIONS

De et al., Caching Techniques for Rapid Provisioning of Virtual Servers in Cloud Environment, IEEE Conference Publication, pp. 1-3, downloaded Jan. 24, 2018 from: http://ieeexplore.ieee.org/document/6211956/.

De et al., Caching VM Instances for Fast VM Provisioning: A Comparative Evaluation; IBM Research India, pp. 1-11, downloaded on Mar. 9, 2018 from: https://www3.cs.stonybrook.edu/~prade/MyPubs/2012-europar.pdf.

Bankole et al., Predicting Cloud Resource Provisioning Using Machine Learning Techniques; IEEE Xplore Digital Library, pp. 1-2, downloaded on Mar. 9, 2018 from: http://ieeexplore.ieee.org/document/6567848.

Amazon Web Services, Migrating AWS Resources to a New AWS Region, pp. 1-43, downloaded on Mar. 8, 2018 from: https://d0.awsstatic.com/whitepapers/aws-migrate-resources-to-new-region.pdf.

Geier, Moving EC2 Instances Across Availability Zones or AWS Regions, pp. 1-4, downloaded on Jan. 24, 2018 from: https://www.serverwatch.com/server-tutorials/moving-ec2-instances-across-availability-zones-or-aws-regions.html.

Google, Moving an Instance Between Zones, pp. 1-5, downloaded Jan. 19, 2018 from: https://cloud.google.com/compute/docs/instances/moving-instance-across-zones.

Google, Live Migration, pp. 1-4, downloaded Jan. 19, 2018 from: https://cloud.google.com/compute/docs/instances/live-migration.

VMware, Inc., VMware VMotion, Live Migration of Virtual Machines Without Service Interruption, pp. 1-2, downloaded on Jan. 19, 2018 from: https://www.vmware.com/pdf/vmotion_datasheet.pdf.

KVM, Migration, pp. 1-4, downloaded Jan. 19, 2018 from: https://www.linux-kvm.org/page/Migration.

Alibaba Cloud, ApsaraDB for RDS, User Guide, pp. 1-79, downloaded Jan. 19, 2018 from: https://www.alibabacloud.com/help/doc-detail/26181.htm.

Scott Scovell, Migrating Azure Virtual Machines to Another Region / Kloud Blog, pp. 1-3, downloaded Jan. 19, 2018 from: https://blog_kloud.com.au/2014/11/16/migrating-azure-virtual-machines-to-another-region/.

Flanegin, Oracle Access Manager—Upgrade Guide, Oct. 2007, pp. 1-654, downloaded on Mar. 9, 2018 from: https://docs.oracle.com/cd/E12530_01/oam.1014/b32416/zdt_ovr.htm.

* cited by examiner

SYSTEM AND METHOD FOR RELOCATING CUSTOMER VIRTUAL MACHINE INSTANCES IN A MULTI-TENANT CLOUD SERVICE

CROSS-REFERENCE TO RELATED APPLICATIONS

This disclosure claims the benefit of U.S. Provisional Patent Application Ser. No. 62/850,794, filed on May 21, 2019, titled "System and Method for Relocating Customer Instances in a Multi-Tenant Service-Oriented Architecture", and assigned to the present assignee, the disclosure of which is hereby incorporated by reference in its entirety.

BACKGROUND

Cloud computing is an information technology (IT) paradigm that enables ubiquitous access to shared pools of configurable system resources and higher-level services that can be rapidly provisioned with minimal management effort, often over the Internet. Third-party Clouds enable organizations to focus on their core businesses instead of expending resources on computer infrastructure and maintenance. Cloud providers typically use a "pay-as-you-go" model, a subscription model, or a variety of other models. A Cloud computing environment (aka "Cloud environment") is a collection of physical and virtual infrastructure hardware and software used for Cloud computing. The Cloud computing environment can be used to provide services (known as "Cloud services").

The combination of Virtual Machines (VMs), network connectivity among them, their operating systems, and middleware and application software stacks on each VM comprise a service instance. In Oracle Cloud services, for example, each service includes a routing tier, a middle tier, and possibly a data tier. Usually, the routing and data tiers are shared among multiple middle tier service instances (hereinafter, instances). Instances are standardized and comprised of a collection (particular to each service) of VM shapes (specifications of CPU, memory, storage).

Cloud services are provisioned on demand. When a customer orders a service, an order processing system receives the type of service being ordered and submits the request to a service provisioning system, which initiates service provisioning. Service provisioning involves creation, configuration, and startup of the instance. This is a lengthy process that typically takes minutes, but sometimes, under high-demand, can take hours.

The process of instance placement on a Cloud environment, more specifically, on which host/server a newly created instance resides, is transparent to the customer/user. Upon receiving the create request, a proprietary placement algorithm finds the best possible host to place the instance according to a pre-defined set of policies and constraints.

In a Cloud computing environment, each virtual machine (VM) belongs a particular customer. The customer could include several different users and/or groups. The users and groups have various roles. Depending on their role, the users and groups can interact or control the life cycle of the VM.

A user will subscribe to the Cloud computing environment by providing identifying information and an intent to utilize one or more services in the future. Once the subscriber is defined, the subscriber can request access to a service instance. When a request for access to the service is received from a remote device, an instance of the service is created on-demand and executed. On-demand creation and execution of the instance is triggered when the Cloud computing environment receives the request for access to the service.

A Cloud Administrator is responsible for installation, operation and maintenance of the Cloud computing environment. The Cloud Administrator could include several different users and/or groups. The users and groups have various roles. Depending on their role, the users and groups can carry out administrative tasks. A Cloud administrator cannot access a customer's virtual machine or data. The Cloud administrator can only manage a common infrastructure such as servers, the network system, and storage systems on behalf of the Cloud provider.

A service instance (hereinafter "instance") is a collection of one or more computing resource(s) interrelated in a way that is defined by the particular service and comprising an orderable and provisionable unit of the service. The instance can be hosted within a virtual machine that executes software of the service using processor, memory, and storage resources of the Cloud computing environment.

An instance could be created with either ephemeral or persistent storage. An ephemeral storage is deleted when the customer deletes the instance. A persistent storage remains available for a later use even after deletion of the instance. In the Oracle Cloud, a customer is allowed to create, delete, stop and start an instance. Typically, customers delete, stop and start instances during maintenance of the operating system (OS) and the application tier running on the instance. The Cloud administrator may need to restart a server due to maintenance, thereby causing the restart of the customer instances running on that server. The Cloud administrator may have administrative access to a server to deny placement of new instances on the server by putting the server in a maintenance mode. This capability is used during maintenance of one or more servers.

In the Oracle Public Cloud, a zone is an equivalent of a logical entity in a physical data center. The Zone constitutes a large number (hundreds) of RACKs of servers (compute nodes). In the Oracle Cloud, each RACK has 36 servers. A zone effectively has thousands of servers. In the Oracle Cloud, a typical server can run about 50 VMs, depending on the shape of the VMs. A typical zone has tens of thousands of VMs. Furthermore, a zone comprises a pool of available resources such as processor, memory, storage, network, and/or other computing resources that can be used by instances assigned to that zone for execution. The zone is an elastic operational environment that is able to adapt to service workload changes by provisioning and de-provisioning computing resources used by instances in an autonomous manner.

The Oracle Public Cloud (OPC) constitutes several geographically distributed data centers. Each of these data centers hosts several thousands of customer VMs (also known as instances). Due to planned or unplanned maintenance, hardware servers hosting customer instances need to power cycle (reboot). This causes customer instances on the servers to restart. In OPC, customer instances are collocated alongside other customer instances. This makes it very difficult to plan maintenance by customers or by a group of servers.

On-demand creation (new or restart) of an instance is time consuming and consumes a large amount of computing resources. The time to create the instance can take minutes or even hours when the Cloud computing environment is under high demand. This is specifically the case during large scale maintenance when a large number of instances spanning across several customers must be restarted. This introduces significant delays in availability of the service to the requestor because the requestor cannot access the service until the instance is fully created and executing. Further, there may not be adequate computing resources available or reserved for the creation of the instance when the request is received, and thus the creation of the instance is further delayed.

During planned maintenance, typically the number of affected servers is few and they are located within a geographic region. Often times, due to security vulnerability or operating system (OS) upgrade, all the servers must be patched and rebooted. This affects all customer instances within a data center.

Such maintenance activity occurs more often than desired and is unavoidable. Existing solutions, such as live patching of ksplice to patch a host OS, mitigates this issue to some extent, but does not work in all cases, such as major OS patches and version upgrades. For mass reboot of servers, due to patching or upgrade, a more scalable and operationally faster and non-disruptive solution is required.

The proposed mechanism of relocation of instances across servers, as forth in the present systems and methods described below, allows the Cloud administrator to move instances, efficiently, faster, at lower cost and at scale.

As a result of the creation and deletion of instances in a Cloud computing environment, a phenomenon known as "resource defragmentation" inevitably occurs. Defragmentation can be described as a scenario where multiple hosts' resources in the same Cloud environment are underutilized. Each host contains resource holes (small segments of unused resources) that cannot be aggregated back together, thereby preventing customers from launching large VM shapes.

The proposed mechanism of relocation of instances across servers, as forth in the present systems and methods described below, allows the Cloud administrator to move VMs around and plug holes and recuperate large chunks of capacity.

When maintenance or upgrades to a Cloud service are performed on a large scale, there is typically a multi-hour outage window. This often involves taking components offline, for example, a virtual platform and virtual machines hosting instances of the Cloud service, and/or instances themselves offline. Thus, access to the Cloud service is suspended during the upgrade or maintenance. Requests to the Cloud service will be denied. During upgrade or maintenance, the operation of computers that rely upon computing services and data hosted by the Cloud service will be significantly impacted. For example, a remote device executing an application that processes data hosted by the Cloud service could timeout, crash, or experience other errors from not being able to access the data. Upgrading and maintaining Cloud services can consume a large amount of computing resources and time, which impacts the operation of the Cloud computing environment.

To perform a zone upgrade or maintenance, instances running in the zone must be brought down, along with their VMs. This process typically takes several hours using prior techniques. Thus, maintenance on a Cloud service with multi-hour unavailability windows could be disruptive and significantly impact any facilities which are dependent on availability of the Cloud service under maintenance.

Cloud infrastructure providers are coping up with ongoing, proactive and reactive maintenance of hardware nodes constituting the Cloud. These hardware nodes may have a customer's virtual machines (instances) executing on the node. It is a challenge to power off the hardware node for maintenance without affecting the customer's virtual machines. Hypervisors used for managing a customer's virtual machine (VM) instances do not provide any tools at the administrator level to mitigate this situation using APIs and at scale.

Presently, the only solution has been to carry out maintenance during a scheduled maintenance window. Customers are informed that their VM instances will be affected randomly within the maintenance window, while Cloud operators race against time to complete the maintenance work within the maintenance window. Clearly, this is very disruptive and expensive for the operators and customers.

In the case of maintenance, the customers must be informed to take an action. This can be problematic since this solution requires that the customer be able to properly perform the needed maintenance during the scheduled maintenance window. If the customer does not properly perform the needed maintenance and/or fails to perform the needed maintenance during the scheduled maintenance window, the customer's VM instance may not operate properly.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for relocating a virtual machine (VM) instance of a computer-implemented and performed service between hardware nodes and for modifying, such as updating or maintaining, a computer-implemented service. The present systems and methods provide an ability to perform Cloud service upgrades or maintenance much faster than prior techniques, thus eliminating or reducing outages with multi-hour unavailability windows. Furthermore, the present systems and methods perform Cloud service upgrades or maintenance in a manner that is transparent to the customers, creates no disruptions in service, does not require a large maintenance window, thereby lowering the cost of the maintenance. For example, several weeks' notice must be given to the customer prior to the start of the maintenance. This advance notice requirement is not acceptable in the case of high severity vulnerability, commonly known as "zero-day vulnerabilities". The relocation of instances without disrupting the runtime state such as OS uptime, network connections, disk IO, and ongoing compute transactions, avoids this problem since the servers can be patched without having to notify the customers. Finally, relocation, as forth in the present systems and methods, allows the Cloud administrator to relocate the VMs to a different server (target node) and recuperate large chunks of capacity. The present systems and methods also apply to hardware node upgrades or maintenance.

A Cloud computing environment or other computing system is capable of executing instances of services requested by remote computing devices. A service comprises an application stack. The application stack comprises one or more application programs having executable code that is executed using computing resources of the Cloud computing environment. For example, the application stack is a suite or group of application programs that are executed to work together to achieve a common goal. The Cloud computing environment may host a variety of services. For example, the service may comprise a calendar service, an email service, a financial analysis service, or any other type of applications that can be executed by the Cloud computing environment.

In one embodiment, a zone is an equivalent of a logic entity in a physical data center. The zone constitutes a large number (hundreds) of RACKs of servers. Furthermore, a zone comprises a pool of available resources such as processor, memory, storage, network, and/or other computing resources that can be used by instances assigned to that zone for execution. The zone is an elastic operational environment that is able to adapt to service workload changes by provisioning and de-provisioning computing resources used by instances in an autonomous manner.

An "Availability Domain" (AD), is an isolated group of servers in the zone arranged such that these are physically isolated and provide fault tolerance and high availability from physical damage to the hosting environment such as fire, flood. A zone comprises at least one or more ADs. Customers are allowed to launch instances across Ads, but cannot access storage due to latency of network.

A "Compute Node" is a physical server where VMs run. In the Cloud, a node runs the hypervisor and runs the VMs on it. A physical network node is an electronic device that is attached to a network, and is capable of creating, receiving, or transmitting information over a communications channel. A passive distribution point such as a distribution frame or patch panel is consequently not a node. A Cloud administrator is responsible for managing compute nodes. Compute nodes have CPU, memory, disk and connect with other compute nodes and storage servers to form the fabric of the Cloud.

"Relocation Controlplane" is a group of distributed microservices communicating over SSL/TLS through REST application programming interfaces (APIs) that send and receive electronic messages to effect relocation of an instance from one source compute node to the target compute node. It constitutes services responsible for authentication and authorization of the request to relocate an instance, managing the state of VM through relocation, persisting and updating the state of the VM, making placement decisions, updating node properties, blocking customer update requests to the VM, error handling and reporting, logging, and interacting with hypervisor on source. Destination compute nodes are used to manage runtime state of the VM, set up storage and networking for the VM on the target compute node and disabling it on the source compute node, and update network subsystem, domain name system, and other state management systems to reflect the new state of the VM on the target node.

A "Virtual Machine" (VM) or "Instance" is a virtual server running on a compute node. Virtualization capabilities are provided by one of the hypervisors such as XEN or KVM.

A VM "Shape" defines what resources and components are configured in the VM. For example, if the system determines the size of the VM (how many CPUs, memories, other assigned components, etc.) then the system finds a similar or compatible host (target) node that can accommodate that amount of resources. It is to be understood that "shape" refers to a template that determines the number of CPUs, amount of memory, and other resources allocated to a VM instance. The customer chooses a shape when a virtual machine instance is launched.

A "Universally Unique Identifier (UUID)", as used in one or more embodiments, is a means of identifying and/or locating an instance in the Cloud. Customers and Cloud administrators commonly refer to an instance by its UUID.

In the Cloud, there is a notion of a VM instance relationship. Customers can express a relationship between instances while creating instances. While relocating, the system and method of the present invention preserves these relationships, as it avoids restart. In prior system, during restart of the VMs, the relationships are broken and re-created upon restart.

A "public IP" defines what IP address is used to access the instance by customer over the internet using secure keys. Typically, customers reserve the public IP with the Cloud provider and expect it to not change during the life of the application.

An "Instance Name" defines what DNS hostname is used to access the instance by the customer over the internet using secure keys.

A "Node Property" is a uniquely identifiable attribute used to tag a compute node through a "Node Property Management Service". A compute node could have one or more distinct node properties. These properties are accessed by other services in the Cloud to aggregate, filter nodes, etc.

A "Node Property Management Service" is a distributed service that maps a set of node properties in a persistent store such as database. It allows adding, deleting, updating and querying of node properties through a REST API.

An "Authorization Service" is a distributed service in the Cloud responsible for verifying the role of the user and/or groups trying to relocate the VM. The service allows adding, deleting, listing and updating policy based permissions for a role over the REST API after authenticating the user and or the group.

A "Relocation Controller" is a distributed service in the Cloud responsible for managing the life cycle of relocation of VMs between two compute nodes. It receives a request for relocation and updates the progress through a REST API. It steps through the process of relocation by interacting with other controlplane services, database and node level services. It processes requests in an asynchronous manner to allow the receiving of several requests and processing them concurrently by delegating it to various instances of the controlplane services.

A "Relocation Node Controller" is a fault tolerant, stateless node level service responsible for node level operations during relocation. Relocation of an instance involves a source node controller and a destination node controller. The source node controller receives the request from the relocation controller and interacts with the hypervisor, the storage and network subsystems, and the destination node controller for managing the life cycle of relocation. It handles various failure conditions and informs the relocation controller.

A "Maintenance Service" is a service responsible for maintenance of a set of compute nodes based on the maintenance profile provided by the Cloud Administrator. It constitutes purpose-built controllers, such as a "Patching Controller". The patching controller is responsible for patching the compute node and rebooting it. The maintenance service receives a request for maintenance from the relocation controller and responds to status update requests. It passes on the request to appropriate controller based on the maintenance profile.

A "Scheduler Controller" is a service controller responsible for executing relocation requests on at prescheduled time. It invokes a relocation controller per schedule.

A "Placement Engine" is a service controller responsible for finding a best place to run an instance. It is used during the launching of a new instance or relocating an instance.

"Live Migration" is a process of migrating a VM from one compute node to the other compute node with no perceptible downtime In one embodiment, the relocation is between two different nodes. Relocating (live migrating) the instance between nodes provides the ability to dynamically reconfigure node resources. This allows for workload management across multiple nodes for improved resource utilization across those nodes. Typically, the Cloud administrator has permission to relocate an instance. Customers do not have permission to relocate their instances. The process is transparent to the customers which is another practical application of the present invention.

As provided herein, the operation of the Cloud computing environment is improved by performing maintenance and upgrades to services in a quick, efficient, and non-disruptive manner. This technical improvement to existing technical processes since the UUIDs of an instance do not change, unlike prior system where instance restart would cause a change of UUID. This is further described below.

To achieve zero down time maintenance of the servers, the servers must be vacated (completely emptied) and the instances must be relocated without shutting them down.

Relocation of instances has several challenges. A set of placement constraints must be satisfied for an instance to run on a server. The placement constraints include hardware configuration of the server, the resources on the server such as CPU, memory, GPU, SSD and metadata assigned to the servers by the OPC control plane, and the locality with respect to an availability domain. Instances should be relocated within the same availability domain where the storage is to avoid latency in accessing disks.

While instances are relocated, their identity (UUID), access keys, and network and storage configuration should remain unchanged. Specifically, the private and public/NAT IP address does not change, boot volumes and data volume storage attachments do not change, and both boot time, as well as, hot plugged storage attachments remain unchanged.

From a security point of view, access to OS on an instance is restricted to customers who own the instance. Typically, customers can connect to the OS on an instance by presenting appropriate credentials. Cloud administrators do not have access to the OS on the instances and do not control CRUD (create, update, delete) operations. For such reasons, it is required to make the instance relocation transparent to the customers and customer applications.

The relocation of instances must be achieved at scale, i.e., must be done concurrently on several instances at once in order to complete the work within a time frame. The number of concurrent relocations is governed by the capacity of the Cloud network and available computing resources in the Cloud.

In order to relocate a VM instance from one node to another node, the existing node is tagged as "under maintenance". The VMs that are running on the existing (source) hardware node are relocated to a different, healthy (target) hardware node which will not be affected by the maintenance. The required maintenance is then performed on the existing hardware node. After the maintenance has been completed on the existing node, the existing node becomes eligible for hosting VMs and the maintenance tag is removed.

In one embodiment, the method for relocating VM instances in a multi-tenant, REST based, micro services architecture does not rely on the customer to perform the instance restart. Instead, the needed maintenance is performed by the Cloud administrator through the use of a specially configured application programming interface (API), in one embodiment of the present system. This leads to significant cost reductions by avoiding downtime for customers and the Cloud operators which is another practical application of the present invention.

Given which of the hardware nodes (servers) will require maintenance, the system administrator API determines which hardware nodes will be best suited for placement of the relocating instances and the relocates the customer's VM instances to target hardware node.

Figure 1:
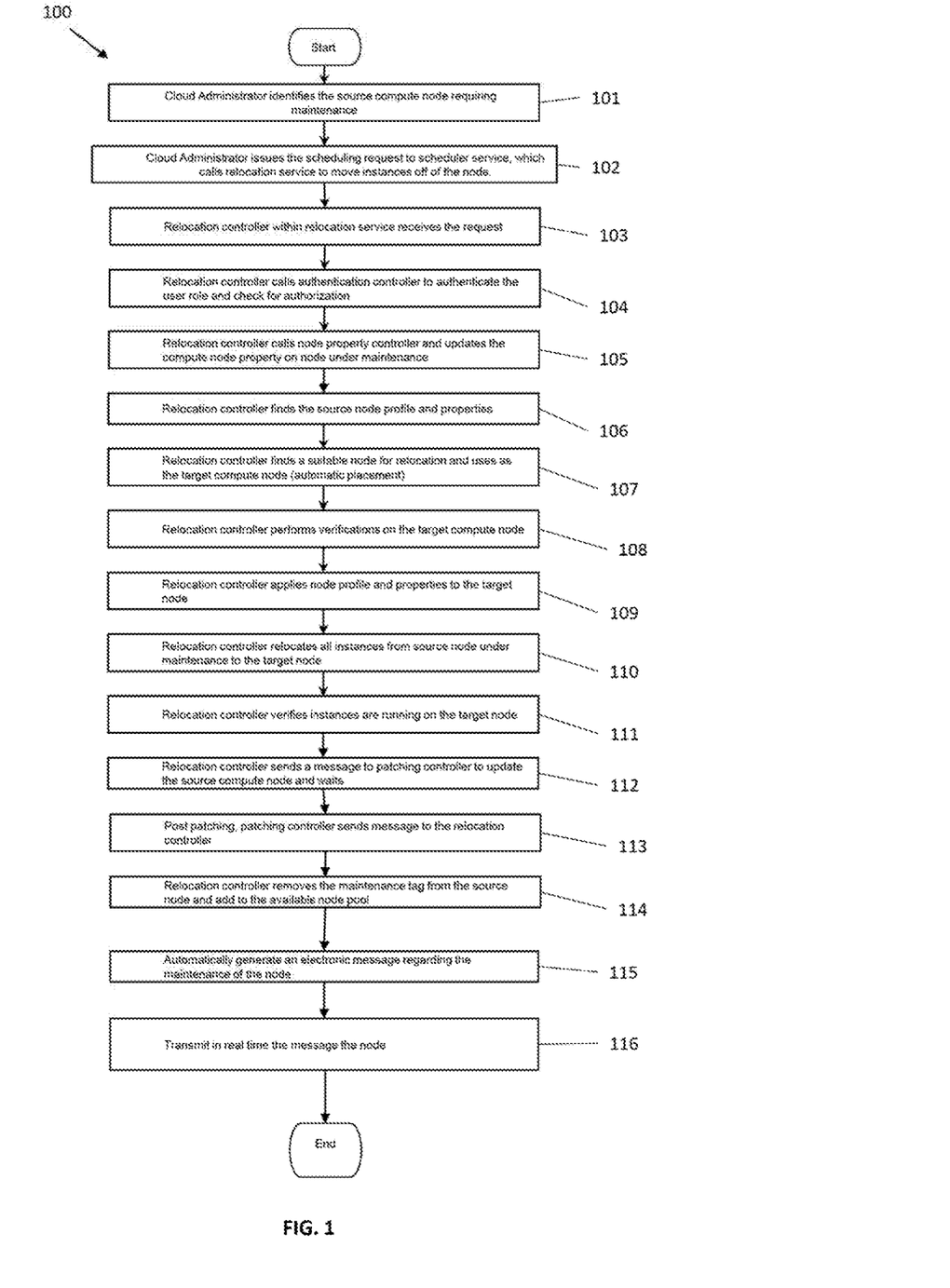
FIG. 1 illustrates one embodiment of a method for node maintenance for one compute node in a multi-tenant, REST based, micro services architecture.

With reference to FIG. 1, computer-implemented method 100 is illustrated that describes one embodiment for conducting maintenance on a computer node in a multi-tenant, REST based, micro services architecture. The method 100 is performed by at least a processor of a computer system that accesses and interacts with memories and/or data storage devices. For example, the processor at least accesses and reads/writes data to the memory and processes network communications to perform the actions of FIG. 1.

With continued reference to FIG. 1, at 101, the method 100 is initiated when the Cloud Administrator identifies the compute source node requiring maintenance.

At 102, the Cloud Administrator issues the relocation request to the relocation service to move instances off of the node. The Cloud Administrator issues the relocation request through the use of a relocation controller (an application programming interface (API)) of the present maintenance system. The API controls an execution of maintenance of the nodes and the migration of the customer's VM instances. An application programming interface (API) is a computing interface to a software component or a system, that defines how other components or systems can use it. It defines the kinds of calls or requests that can be made, how to make them, the data formats that should be used, the conventions to follow, etc. The API can also provide extension mechanisms so that users can extend existing functionality in various ways and to varying degrees. An API can be entirely custom, specific to a component, or it can be a combination of features designed to ensure interoperability. Some APIs have to be documented; others are designed so that they can be "interrogated" to determine supported functionality. Since other components/systems rely only on the API, the system that provides the API can (ideally) change its internal details "behind" that API without affecting its users.

At 103, the relocation controller (API) within the relocation service receives the request.

At 104, the relocation controller (API) calls the authentication controller to authenticate the user role and check for authorization.

At 105, the relocation controller (API) calls the node property controller and updates the source compute node property on the source compute node under maintenance. (This disables new instance launches on the source compute node).

At 106, the relocation controller (API) finds the source compute node profile and its properties.

At 107, the relocation controller (API) finds a suitable node for relocation and uses it as the target compute node (automatic placement through placement engine during live migration).

At 108, the relocation controller (API) performs verifications on the target compute node.

At 109, the relocation controller (API) applies the node profile and properties to the target compute node.

At 110, the relocation controller (API) relocates all instances (VMs) from the source compute node under maintenance to the target node. Also, the relocation controller (API) verifies that the instances (VMs) are running on the target compute node.

At 112, the relocation controller (API) sends a message to the patching controller to update the source compute node and waits.

At 113, after patching, the patching controller sends a message to the relocation controller (API). The message, for example, may include information informing the relocation controller (API) that the patching has been completed on the node.

At 114, the relocation controller (API) removes the maintenance tag from the source compute node and adds the source compute node to the available node pool. At this point the maintenance of the individual compute node is complete.

At 115, the API automatically generates and sends electronic message regarding the maintenance of the source node.

At 116, the API transmits, in real time the electronic message regarding the maintenance of the source node to the Cloud administrator.

Figure 2:
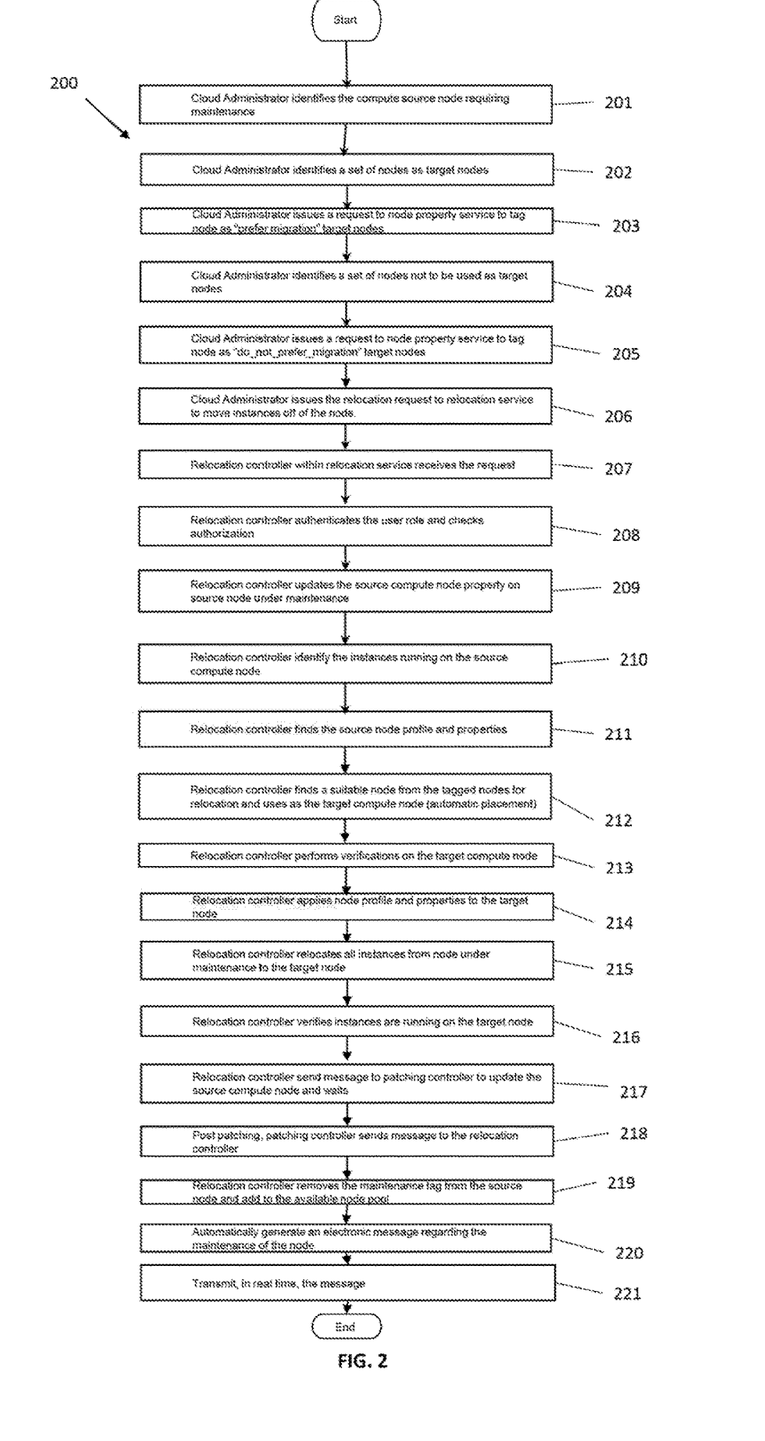
FIG. 2 illustrates one embodiment of a method for node maintenance for a set of compute nodes in a multi-tenant, REST based, micro services architecture.

With reference to FIG. 2, computer-implemented method 200 is illustrated that describes one embodiment for conducting maintenance on a set of computer nodes in a multi-tenant, REST based, micro services architecture. The method 200 is performed by at least a processor of a computer system that accesses and interacts with memories and/or data storage devices. For example, the processor at least accesses and reads/writes data to the memory and processes network communications to perform the actions of FIG. 2.

With reference to FIG. 2, at 201, the method 200 is initiated when the Cloud Administrator identifies the compute nodes requiring maintenance.

At 202, the Cloud Administrator identifies a set of nodes as target nodes.

At 203, the Cloud Administrator issues a request to the node property service to tag the target nodes as "prefer_migration" target nodes.

At 204, the Cloud Administrator identifies a set of nodes not to be used (excluded) as target nodes.

At 205, the Cloud Administrator issues a request to the node property service to tag the set of nodes not to be used as target nodes as "do_not_prefer_migration" target nodes.

At 206, the Cloud Administrator issues the relocation request to the relocation service (API) to move instances (VMs) off of the source compute nodes.

At 207, the relocation controller (API) within the relocation service receives the request.

At 208, the relocation controller (API) authenticates the user role and checks authorization.

At 209, the relocation controller (API) updates the source compute node property on the nodes under maintenance. (This disables new instance (VM) launches on the source compute nodes).

At 210, the relocation controller (API) identifies the instances (VMs) running on the source compute nodes.

At 211, the relocation controller (API) finds the source compute nodes profile and properties.

At 212, the relocation controller (API) finds suitable target nodes from the tagged target nodes for relocation of the instances (VMs) and uses these suitable nodes as the target compute nodes using the placement service At 213, the relocation controller (API) performs verifications on the target nodes.

At 214, the relocation controller (API) applies the node profile and properties to the target compute nodes.

At 215, the relocation controller (API) relocates all instances (VMs) from the source compute node under maintenance to the target compute nodes.

At 216, the relocation controller (API) verifies instances are running on the target nodes.

At 217, the relocation controller (API) sends a message to the patching controller to update the source compute nodes and waits.

At 218, post patching, the patching controller sends a message to the relocation controller (API). The message, for example, may include information informing the relocation controller (API) that the patching has been completed on the nodes.

At 219, the relocation controller (API) removes the maintenance tag from the source compute nodes and adds the source compute nodes to the available nodes pool. At this point the maintenance of the set of compute source nodes is complete.

At 220, the API automatically generates and electronic message regarding the maintenance of the source nodes.

At 221, the API transmits, in real time the electronic message regarding the maintenance of the source nodes to the Cloud administrator.

Figure 3:
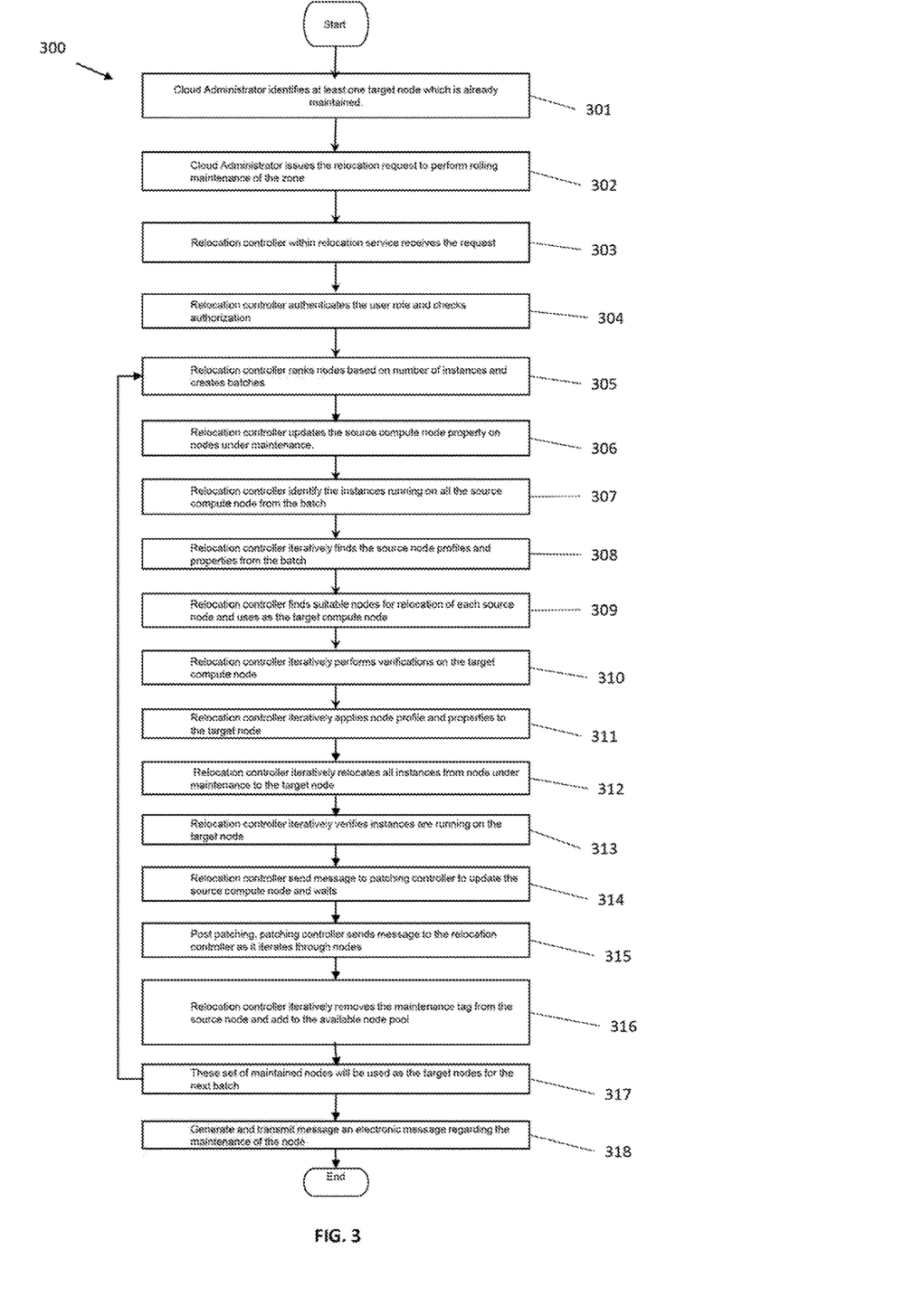
FIG. 3 illustrates one embodiment of a method for node maintenance for an entire zone in a multi-tenant, REST based, micro services architecture.

With reference to FIG. 3, computer-implemented method 300 is illustrated that describes one embodiment for conducting maintenance on an entire zone in a multi-tenant, REST based, micro services architecture. The method 300 is performed by at least a processor of a computer system that accesses and interacts with memories and/or data storage devices. For example, the processor at least accesses and reads/writes data to the memory and processes network communications to perform the actions of FIG. 3.

With reference to FIG. 3, at 301, the method 300 is initiated when the Cloud Administrator identifies at least one target node which is already maintained.

At 302, the Cloud Administrator issues the relocation request to perform rolling maintenance of the zone.

At 303, the relocation controller (API) within the relocation service receives the request.

At 304, the relocation controller (API) authenticates the user role and checks authorization.

At 305, the relocation controller (API) ranks the source compute nodes based on number of instances and creates batches.

At 306, the relocation controller (API) updates the compute source node property on source compute nodes under maintenance. (This disables new instance launches on the source compute nodes).

At 307, the relocation controller (API) identifies the instances (VMs) running on all the source compute nodes from the batch.

At 308, the relocation controller (API) iteratively finds the source node profiles and properties from the batch.

At 309, the relocation controller (API) finds suitable nodes for relocation of each source compute nodes and uses as the target compute nodes (automatic placement through placement service using live migration).

At 310, the relocation controller (API) iteratively performs verifications on the target compute nodes.

At 311, the relocation controller (API) iteratively applies node profile and properties to the target compute nodes.

At 312, the relocation controller (API) iteratively relocates all instances from the source compute nodes under maintenance to the target compute nodes.

At 313, the relocation controller (API) iteratively verifies that the instances (VMs) are running on the target compute nodes.

At 314, the relocation controller (API) sends a message to patching controller to update the source compute nodes and waits.

At 315, after patching, the patching controller sends a message to the relocation controller (API) as it iterates through the nodes. The message, for example, may include information informing the relocation controller (API) that the patching has been completed on the nodes.

At 316, the relocation controller (API) iteratively removes the maintenance tag from the source compute nodes and adds these source compute nodes to the available nodes pool.

At 317, these set of maintained nodes will be used as the target nodes for the next batch. The process is repeated for the rest of the batches.

At 318, the API automatically generates and electronic message regarding the maintenance of the source nodes and transmits, in real time the electronic message regarding the maintenance of the source nodes to the Cloud administrator.

Computing Device Embodiment

Figure 4:
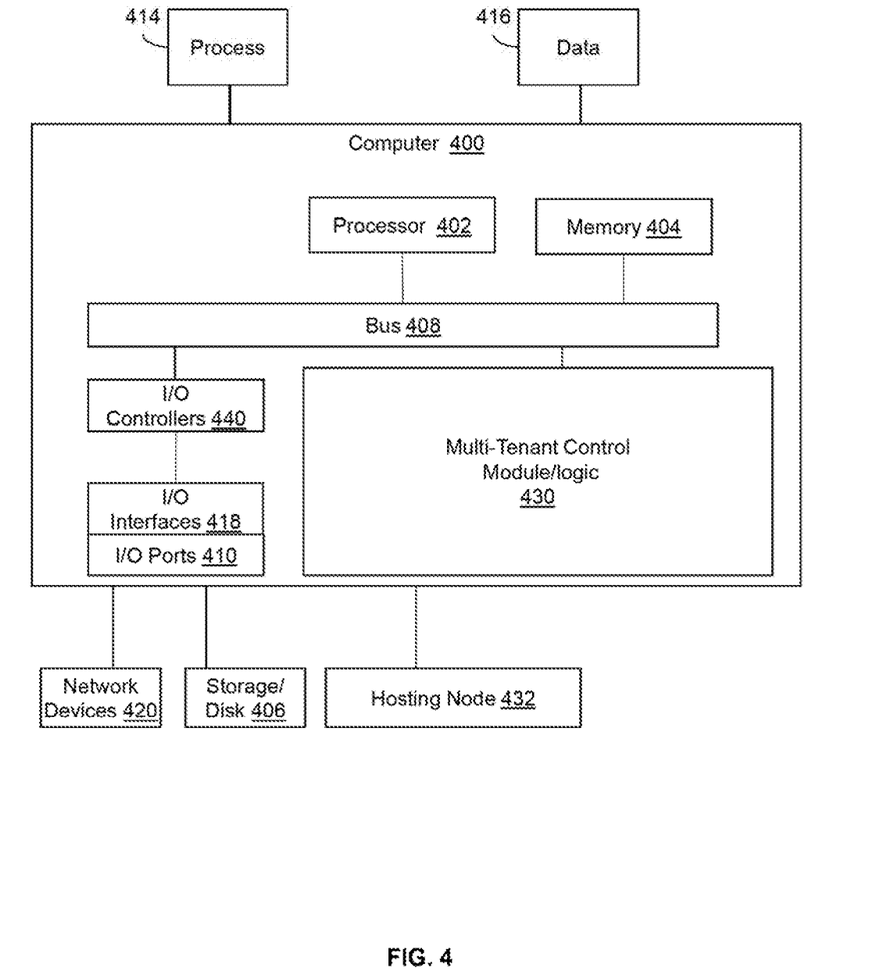
FIG. 4 illustrates an embodiment of a special purpose computing system configured with the example systems and/or methods disclosed.

FIG. 4 illustrates an example special purpose computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include a multi-tenant control module/logic 430 configured to facilitate relocating customer VM instances in a multi-tenant, REST based, micro services architecture, as performed by the method of FIG. 1. In one example, the computer 400 may also be operably connected to a hosting node 432 which interacts with multi-tenant control module/logic 430. In different examples, the logic 430 may be implemented in hardware, a non-transitory computer-readable medium with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a special purpose server operating in a Cloud computing system, a server configured in a Software as a Service (SaaS) architecture, a smart phone, laptop, tablet computing device, and so on.

Describing an example configuration of the computer 400, the processor 402 may be a variety of various specially programmed processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an I/O controller 440, an input/output (I/O) interface (e.g., card, device) 418 and an input/output port 410. The disk 406 may be, for example, a magnetic disk drive, a solid-state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with input/output (I/O) devices via the I/O controller 440, the I/O interfaces 418, and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 400 can operate in a network environment and thus may be connected to the network devices 420 via the I/O controller 440, the I/O interfaces 418, and/or the I/O ports 410. Through the network devices 420, the computer 400 may interact with a network. Through the network, the computer 400 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a Cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S. C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Use r", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, the method comprising:
   generating a graphical user interface on a display screen, wherein the graphical user interface is associated with monitoring and controlling a maintenance of a source compute node;
   in response to a system administrator interaction with the graphical user interface, access an application programming interface (API);
   in response to accessing the API, executing the API, through at least a processor accessing one or more memories, wherein the application programming interface controls execution of maintenance of source nodes by:
   establishing a maintenance schedule of a source node, wherein a selected maintenance is to be performed on the source node, and wherein the maintenance schedule specifies a prescheduled time to begin maintenance of the source node;
   in response to arriving at the prescheduled time, automatically performing the following steps:
      assigning a maintenance tag to the source node when the selected maintenance is to be performed in accordance with the established maintenance schedule;
      identifying one or more virtual machine instances that are configured on the source node and will be affected by the maintenance schedule;
      selecting a target node that is available to host the one or more virtual machine instances of the source node;
      updating, by the API, a source node property that disables new virtual machine instances from launching on the source node;
      determining, by the API, a source node profile and source node properties;
      applying, by the API, the source node profile and the source node properties to the target node;
      relocating the one or more virtual machine instances from the source node to the target node to vacate the source node of virtual machine instances prior to performing the selected maintenance on the source node;
      in response to the relocating, re-initiating run-time execution of the one or more virtual machines on the target node;
      verifying, by the API, that the one or more virtual machine instances are running on the target node;
      in response to the verifying, performing the selected maintenance on the source node;
      in response to completing the selected maintenance on the source node, removing, by the API, the maintenance tag from the source node and adding, by the API, the source node to an available node pool.

2. The method of claim 1, wherein the method further comprises:
   issuing a request to identify the target node as a preferred migration target node.

3. The method of claim 1, wherein the method further comprises:
   issuing a request to identify the target node as a not preferred migration target node.

4. The method of claim 1, wherein the method further comprises:
   generating, by the API, a message regarding a maintenance updating of the source node; and
   transmitting, by the API, the message regarding the maintenance updating of the source node to a patching controller.

5. The method of claim 1, wherein in response to the selected maintenance being completed:
   automatically generating an electronic message containing content of the performance of the selected maintenance on the source node; and
   control, by at least the processor using a network communication, transmission in real time of the electronic message including content of the performance of the selected maintenance on the source node so that there is immediate access to the content of the performance of the selected maintenance on the source node.

6. A non-transitory computer-readable medium storing computer-executable instructions that, when executed by at least a processor of a computer, cause the computer to:
   generate a graphical user interface on a display screen, wherein the graphical user interface is associated with monitoring and controlling a maintenance of a source compute node;
   in response to a system administrator interaction with the graphical user interface, access an application programming interface (API);
   in response to accessing the API, execute the API, through at least the processor accessing one or more memories, such that the application programming interface includes instructions configured for controlling execution of maintenance of source nodes by;
   establishing a maintenance schedule of a source node, wherein a selected maintenance is to be performed on the source node, and wherein the maintenance schedule specifies a prescheduled time to begin maintenance of the source node;
   in response to arriving at the prescheduled time, automatically performing the following steps:
   assigning a maintenance tag to the source node when the selected maintenance is to be performed in accordance with the established maintenance schedule;
   identifying one or more virtual machine instances that are configured on the source node and will be affected by the maintenance schedule;
   selecting a target node that is available to host the one or more virtual machine instances of the source node;
   updating, by the API, a source node property that disables new virtual machine instances from launching on the source node;
   determining, by the API, a source node profile and source node properties;
   applying, by the API, the source node profile and the source node properties to the target node;
   relocating the one or more virtual machine instances from the source node to the target node to vacate the source node of virtual machine instances prior to performing the selected maintenance on the source node;
   in response to the relocating, re-initiating run-time execution of the one or more virtual machines on the target node;
   verifying, by the API, that the one or more virtual machine instances are running on the target node;
   in response to the verifying, performing the selected maintenance on the source node;
   in response to completing the selected maintenance on the source node, removing, by the API, the maintenance tag from the source node and adding, by the API, the source node to an available node pool.

17

7. The non-transitory computer-readable medium of claim 6, further comprising instructions that, when executed by at least the processor, cause the processor to:
   identify the target node as a preferred migration target node.

8. The non-transitory computer-readable medium of claim 6, further comprising instructions that, when executed by at least the processor, cause the processor to:
   identify the target node as a not preferred migration target node.

9. The non-transitory computer-readable medium of claim 6, further comprising instructions that, when executed by at least the API, cause the API to:
   generate a message regarding a maintenance updating of the source node; and
   transmit the message regarding the maintenance updating of the source node to a patching controller.

10. The non-transitory computer-readable medium of claim 6, wherein in response to the selected maintenance being completed:
    automatically generating an electronic message containing content of the performance of the selected maintenance on the source node; and
    control, by at least the processor using a network communication, transmission in real time of the electronic message including content of the performance of the selected maintenance on the source node so that there is immediate access to the content of the performance of the selected maintenance on the source node.

11. A computing system, comprising:
    a display screen having a graphical user interface, wherein the graphical user interface is associated with monitoring and controlling a maintenance of a source compute node;
    at least an application programming interface (API) accessible by the graphical user interface by a system administrator, wherein the API is connected to at least one processor connected to at least one memory comprising a non-transitory computer readable medium; and
    a multi-tenant control module stored on the memory and including instructions that, when executed by the at least one processor, cause the at least one processor to:
       execute the application programming interface (API), through the at least one processor accessing one or more memories, wherein the application programming interface controls execution of maintenance of a source node by;
          establishing a maintenance schedule of a source node, wherein a selected maintenance is to be performed on the source node, and wherein the maintenance schedule specifies a prescheduled time to begin maintenance of the source node;
          in response to arriving at the prescheduled time, automatically performing the following steps:
             assigning a maintenance tag to the source node when the selected maintenance is to be performed in accordance with the established maintenance schedule;
             identifying one or more virtual machine instances that are configured on the source node and that will be affected by the maintenance schedule;
             selecting a target node that is available to host the one or more virtual machine instances of the source node;
             updating, by the API, a source node property in order to disable new virtual machine instance launches on the source node;
             determining, by the API, a source node profile and source node properties;
             applying, by the API, the source node profile and the source node properties to the target node;
             live migrating the one or more virtual machine instances from the source node to the target node to vacate the source node of virtual machine instances prior to performing the selected maintenance on the source node;
             in response to the live migrating, re-initiating run-time execution of the one or more virtual machines on the target node;
             verifying, by the API, that the one or more virtual machine instances are running on the target node;
             in response to the verifying, performing the selected maintenance on the source node;
             in response to completing the selected maintenance on the source node, removing, by the API, the maintenance tag from the source node and adding, by the API, the source node to an available node pool.

12. The computing system of claim 11, wherein the multi-tenant control module further includes instructions that, when executed by at least the processor, cause the processor to:
    identify the target node as a preferred migration target node.

13. The computing system of claim 11, wherein the multi-tenant control module further includes instructions that, when executed by at least the processor, cause the processor to:
    identify the target node as a not preferred migration target node.

14. The computing system of claim 11, wherein the multi-tenant control module further includes instructions that, when executed by at least the API, cause the API to:
    generate, by the API, a message regarding a maintenance updating of the source node; and
    transmit, by the API, the message regarding the maintenance updating of the source node to a patching controller.

15. The computing system of claim 11, wherein in response to the selected maintenance being completed:
    automatically generating an electronic message containing content of the performance of the selected maintenance on the source node; and
    control, by at least the processor using a network communication, transmission in real time of the electronic message including content of the performance of the selected maintenance on the source node so that there is immediate access to the content of the performance of the selected maintenance on the source node.

\* \* \* \* \*